(12) United States Patent
Klontz et al.

(10) Patent No.: US 10,505,412 B2
(45) Date of Patent: Dec. 10, 2019

(54) FLUX MACHINE

(71) Applicant: ClearWater Holdings, LTD, Marina Del Rey, CA (US)

(72) Inventors: Keith Klontz, Seminole, FL (US); Haodong Li, Seminole, FL (US)

(73) Assignee: ClearWater Holdings, Ltd., Marina Del Rey, CA (US)

( * ) Notice: Subject to any disclaimer, the term of this patent is extended or adjusted under 35 U.S.C. 154(b) by 427 days.

(21) Appl. No.: 14/162,611

(22) Filed: Jan. 23, 2014

(65) Prior Publication Data

US 2014/0203679 A1    Jul. 24, 2014

Related U.S. Application Data

(60) Provisional application No. 61/756,404, filed on Jan. 24, 2013.

(51) Int. Cl.
*H02K 1/27* (2006.01)
*H02K 21/22* (2006.01)
(Continued)

(52) U.S. Cl.
CPC .............. *H02K 1/27* (2013.01); *H02K 1/14* (2013.01); *H02K 1/18* (2013.01); *H02K 1/278* (2013.01); *H02K 3/46* (2013.01); *H02K 21/12* (2013.01); *H02K 1/2786* (2013.01); *H02K 1/2793* (2013.01); *H02K 16/02* (2013.01);
(Continued)

(58) Field of Classification Search
CPC .. H02K 1/14; H02K 1/18; H02K 1/27; H02K 1/278; H02K 1/2786; H02K 1/2793; H02K 16/02; H02K 21/12; H02K 21/14; H02K 21/22; H02K 21/24; H02K 3/46; H02K 2213/12; H02K 21/18; H02K 2201/12

USPC ......... 310/114, 115, 156.07, 156.36, 156.37, 310/156.02, 254.1
See application file for complete search history.

(56) References Cited

U.S. PATENT DOCUMENTS 3,435,267 A    3/1969   Beyersdorf
4,185,366 A    1/1980   Gilbert
(Continued)

FOREIGN PATENT DOCUMENTS

CL          41.687        2/2017
CN      106233579 A      12/2016
(Continued)

OTHER PUBLICATIONS

Decision of Rejection dated Jan. 26, 2016. JP Patent Application No. JP2014-111950.
(Continued)

*Primary Examiner* — Burton S Mullins
*Assistant Examiner* — Alexander Moraza
(74) *Attorney, Agent, or Firm* — Nixon Peabody LLP

(57) ABSTRACT

A flux machine includes a stator and a rotor. A set of electrical coil assemblies with side surfaces and sets of plural permanent magnets are arranged circularly on the stator and the rotor. Pole faces of the magnets are positioned adjacent to and spaced apart from side surfaces of permeable cores of the coil assemblies. In each coil assembly a pair of like pole faces of the magnets mutually face across the permeable core and a third magnet pole face faces transversely relative to the mutually facing pole faces of the pair of magnets.

21 Claims, 13 Drawing Sheets

(51) Int. Cl.

| | |
|---|---|
| *H02K 3/46* | (2006.01) |
| *H02K 16/02* | (2006.01) |
| *H02K 21/12* | (2006.01) |
| *H02K 1/14* | (2006.01) |
| *H02K 1/18* | (2006.01) |
| H02K 21/14 | (2006.01) |
| H02K 21/24 | (2006.01) |

(52) U.S. Cl.
CPC ............ *H02K 21/14* (2013.01); *H02K 21/22* (2013.01); *H02K 21/24* (2013.01); *H02K 2201/12* (2013.01)

(56) References Cited

U.S. PATENT DOCUMENTS

| | | | |
|---|---|---|---|
| 4,286,198 A | | 8/1981 | de Valroger |
| 4,370,577 A | | 1/1983 | Wakabayashi |
| 4,441,043 A | * | 4/1984 | DeCesare .............. H02K 19/00 310/112 |
| 4,458,228 A | | 7/1984 | Baumgartner |
| 4,542,323 A | | 9/1985 | Doemen |
| 4,563,602 A | | 1/1986 | Nagasaka |
| 4,568,862 A | | 2/1986 | Tassinario |
| 4,626,751 A | | 12/1986 | Doemen |
| 4,802,690 A | | 2/1989 | Raidel |
| 4,806,832 A | | 2/1989 | Muller |
| 4,924,156 A | | 5/1990 | Muller |
| 4,973,869 A | | 11/1990 | Cho |
| 5,038,083 A | | 8/1991 | Muller |
| 5,051,641 A | | 9/1991 | Weh |
| 5,117,142 A | | 5/1992 | von Zweygbergk |
| 5,128,570 A | | 7/1992 | Isozaki |
| 5,130,583 A | | 7/1992 | Andoh |
| 5,134,682 A | | 7/1992 | Muller |
| 5,142,181 A | | 8/1992 | Newell |
| 5,289,072 A | | 2/1994 | Lange |
| 5,474,799 A | | 12/1995 | Thigpen et al. |
| 5,543,674 A | | 8/1996 | Koehler |
| 5,708,310 A | | 1/1998 | Sakamoto |
| 5,777,418 A | | 7/1998 | Lange |
| 5,838,079 A | | 11/1998 | Morohashi |
| 5,894,902 A | | 4/1999 | Cho |
| 5,942,828 A | | 8/1999 | Hill |
| 5,952,743 A | | 9/1999 | Sidey |
| 5,973,436 A | | 10/1999 | Mitcham |
| 5,977,684 A | | 11/1999 | Lin |
| 6,011,339 A | | 1/2000 | Kawakami |
| 6,043,579 A | | 3/2000 | Hill |
| 6,222,287 B1 | | 4/2001 | Suzuki |
| 6,414,408 B1 | | 7/2002 | Erdman et al. |
| 6,492,758 B1 | | 12/2002 | Gianni |
| 6,700,267 B2 | | 3/2004 | Weiss |
| 6,710,581 B1 | | 3/2004 | Lee |
| 6,729,140 B2 | | 5/2004 | Care |
| 6,741,010 B2 | | 5/2004 | Wilkin |
| 6,798,089 B1 | | 9/2004 | Smit |
| 6,803,691 B2 | | 10/2004 | Rose |
| 6,847,135 B2 | | 1/2005 | Kastinger |
| 6,870,284 B2 | | 3/2005 | Uchida |
| 6,888,272 B2 | | 5/2005 | Kastinger |
| 6,924,574 B2 | | 8/2005 | Qu et al. |
| 6,952,068 B2 | | 10/2005 | Gieras |
| 7,030,529 B2 | | 4/2006 | Dommsch |
| 7,067,942 B2 | | 6/2006 | Korenaga |
| 7,124,495 B2 | | 10/2006 | Gieras |
| 7,164,220 B2 | | 1/2007 | Gilmour |
| 7,466,058 B2 | | 12/2008 | Dubois |
| 7,492,074 B1 | | 2/2009 | Rittenhouse |
| 7,579,742 B1 | | 8/2009 | Rittenhouse |
| 7,633,198 B2 | | 12/2009 | Kirkman et al. |
| 7,652,406 B2 | | 1/2010 | Kim |
| 7,701,678 B2 | | 4/2010 | Dooley |
| 7,755,244 B2 | | 7/2010 | Ley et al. |
| 7,777,381 B2 | | 8/2010 | Takeuchi |
| 7,791,245 B1 | | 9/2010 | Hao |
| 7,812,500 B1 | | 10/2010 | Ham |
| 7,884,563 B2 | | 2/2011 | Takeuchi |
| 7,906,885 B2 | | 3/2011 | Lu |
| 7,944,107 B2 | | 5/2011 | Thoms |
| 7,944,112 B2 | | 5/2011 | Kim |
| 7,960,893 B2 | | 6/2011 | Kim |
| 7,986,069 B2 | | 7/2011 | Takeuchi |
| 7,990,019 B2 | | 8/2011 | Sung |
| 8,053,946 B2 | | 11/2011 | Koizumi |
| 8,058,763 B2 | | 11/2011 | Clark |
| 8,074,922 B2 | | 12/2011 | Bojiuc |
| 8,084,879 B2 | | 12/2011 | Stiesdal |
| 8,089,175 B2 | | 1/2012 | Stiesdal |
| 8,106,563 B2 | | 1/2012 | Ritchey |
| 8,207,644 B2 | | 1/2012 | Himmelmann |
| 8,110,961 B2 | | 2/2012 | Hsu |
| 8,115,361 B2 | | 2/2012 | Iki |
| 8,154,146 B2 | | 4/2012 | Fischer |
| 8,159,104 B1 | | 4/2012 | Bojiuc |
| 8,169,109 B2 | | 5/2012 | Skyes |
| 8,188,633 B2 | | 5/2012 | Quere |
| 8,207,648 B2 | | 6/2012 | HuLi |
| 8,212,445 B2 | | 7/2012 | Ritchey |
| 8,232,695 B2 | | 7/2012 | Bojiuc |
| 8,258,782 B2 | | 9/2012 | Kaita |
| 8,264,120 B2 | | 9/2012 | Hsu |
| 8,274,191 B2 | | 9/2012 | Stiesdal |
| 8,278,872 B2 | | 10/2012 | Li |
| 8,283,813 B2 | | 10/2012 | Gilchrist et al. |
| 8,288,916 B2 | | 10/2012 | Quere |
| 8,294,322 B2 | | 10/2012 | Aiki |
| 8,299,676 B2 | | 10/2012 | Miyata |
| 8,330,404 B2 | | 12/2012 | Sakai et al. |
| 8,334,634 B2 | | 12/2012 | Palmer |
| 8,339,009 B2 | | 12/2012 | Mueller |
| 8,344,567 B2 | | 1/2013 | Kamiki |
| 8,350,442 B2 | | 1/2013 | Akutsu |
| 8,354,768 B2 | | 1/2013 | Cipriani |
| 8,358,046 B2 | | 1/2013 | Platon |
| 8,373,319 B1 | | 2/2013 | Barnes |
| 8,381,389 B2 | | 2/2013 | Lisi |
| 8,390,168 B2 | | 3/2013 | Hsu |
| 8,432,081 B2 | | 4/2013 | Wang |
| 8,436,507 B2 | | 5/2013 | Chien |
| 8,482,171 B2 | | 7/2013 | Edwards |
| 8,536,751 B2 | | 9/2013 | Cipriani |
| 8,536,758 B2 | | 9/2013 | Lisi |
| 8,546,988 B2 | | 10/2013 | Bright |
| 2002/0130655 A1 | | 9/2002 | Okada et al. |
| 2003/0011455 A1 | | 1/2003 | Wakuda |
| 2003/0025417 A1 | | 2/2003 | Rose |
| 2003/0102770 A1 | | 6/2003 | Laskaris |
| 2003/0127917 A1 | | 7/2003 | Kang |
| 2003/0230946 A1 | | 12/2003 | Durham et al. |
| 2004/0061397 A1 | | 4/2004 | Rose |
| 2004/0155548 A1 | | 8/2004 | Rasmussen |
| 2004/0239199 A1 | * | 12/2004 | Qu ........................ H02K 21/16 310/114 |
| 2004/0251759 A1 | | 12/2004 | Hirzel |
| 2005/0104456 A1 | | 5/2005 | Yajima |
| 2005/0179336 A1 | | 8/2005 | Hasebe et al. |
| 2006/0022544 A1 | | 2/2006 | Kinashi |
| 2006/0038456 A1 | | 2/2006 | Bojiuc |
| 2006/0043821 A1 | | 3/2006 | Kojima et al. |
| 2006/0192453 A1 | | 8/2006 | Gieras |
| 2007/0216249 A1 | | 9/2007 | Gruendel |
| 2007/0228860 A1 | * | 10/2007 | Rao ........................ H02K 1/12 310/156.37 |
| 2007/0247017 A1 | | 10/2007 | Bumby |
| 2007/0267929 A1 | | 11/2007 | Pulnikov |
| 2008/0048505 A1 | | 2/2008 | Moriyama |
| 2008/0122311 A1 | | 5/2008 | Werst et al. |
| 2008/0136272 A1 | | 6/2008 | Ishikawa |
| 2008/0211326 A1 | | 9/2008 | Kang |
| 2008/0246362 A1 | | 10/2008 | Hirzel |
| 2008/0278020 A1 | * | 11/2008 | Ley ........................ H02K 1/148 310/156.36 |
| 2009/0026869 A1 | | 1/2009 | Kaehler |

(56) References Cited

U.S. PATENT DOCUMENTS

| | | |
|---|---|---|
| 2009/0102305 A1 | 4/2009 | Lu |
| 2009/0108712 A1 | 4/2009 | Holtzapple |
| 2009/0243413 A1 | 10/2009 | Gilchrist |
| 2010/0101879 A1 | 4/2010 | McVickers |
| 2010/0327787 A1 | 12/2010 | Sakai |
| 2011/0058967 A1 | 3/2011 | Arita et al. |
| 2011/0109190 A1 | 5/2011 | Aoyama |
| 2011/0234033 A1* | 9/2011 | Filatov ............... F16C 32/0485 310/90.5 |
| 2012/0228977 A1 | 9/2012 | Petro et al. |
| 2012/0299405 A1 | 11/2012 | Li |
| 2012/0299430 A1 | 11/2012 | Pennander et al. |
| 2012/0306212 A1* | 12/2012 | Sarmiento Munoz ...................... H02K 7/1838 290/55 |
| 2013/0270955 A1 | 10/2013 | Lillington |
| 2014/0191612 A1 | 7/2014 | Mariotto |

FOREIGN PATENT DOCUMENTS

| | | |
|---|---|---|
| DE | 3142913 A1 | 5/1983 |
| DE | 10037787 A1 | 3/2002 |
| EP | 2168225 A4 | 6/2015 |
| IN | 201627027705 A | 10/2016 |
| JP | 1973-486323 | 2/1973 |
| JP | S49-34082 | 9/1974 |
| JP | S455-160964 | 12/1980 |
| JP | H04-359656 A | 12/1992 |
| JP | 1994-005380 | 1/1994 |
| JP | 2001-211623 A | 8/2001 |
| JP | 2005/287103 A | 10/2005 |
| JP | 2006-280066 A | 10/2006 |
| KR | 16-130755 | 11/2016 |
| RU | 2 131 637 C1 | 6/1999 |
| TW | 200919903 | 5/2009 |
| TW | 201444231 A | 11/2014 |
| TW | 201618438 | 5/2016 |
| WO | WO 91/07805 | 5/1991 |
| WO | WO 93/15547 A1 | 8/1993 |
| WO | WO 03/065554 A1 | 8/2003 |
| WO | WO 2003/094328 A1 | 11/2003 |
| WO | WO 2006/117210 A1 | 11/2006 |
| WO | WO 2007/000054 A1 | 1/2007 |
| WO | PCT/US2008/008434 | 1/2009 |
| WO | WO 2009/009075 A1 | 1/2009 |
| WO | WO 2009/070333 A1 | 6/2009 |
| WO | WO 2015/122190 A1 | 8/2015 |
| WO | WO 2016014717 A1 | 1/2016 |

OTHER PUBLICATIONS

JP Office Action dated Mar. 7, 2017. JP Patent Application No. JP2016-100297.

Decision of Rejection dated Mar. 7, 2017. JP Patent Application No. JP2016-100297; Ref. JP S49-34082.

Decision of Rejection dated Mar. 7, 2017. JP Patent Application No. JP2016-100297; Ref. JP S455-160964.

Extended EP Search Report dated May 22, 2015.

International Search Report dated Sep. 26, 2008.

International Search Report dated Nov. 26, 2014.

International Search Report dated Oct. 7, 2015.

Extended European Search Report in European Patent Application No. 14879806.9, dated Apr. 28, 2017 (12 pages).

\* cited by examiner

US 10,505,412 B2

FLUX MACHINE

RELATED APPLICATIONS

In full or in part, this application describes the same apparatus and method as presented in provisional application 61/756,404, filed on Jan. 24, 2013, and claims international date priority thereof as a non-provisional utility application. The subject matter of application 61/756,404 is hereby incorporated herein by reference in its entirety.

BACKGROUND

The industrial field of this disclosure relates to electric motors and generators and their methods of construction and operation. In particular this disclosure is directed to a flux machine (FM) that may be operated as a motor or generator. Efficiency in motors and generators is critically important to commercial feasibility. Therefore arrangement of the magnets and coils that generate the flux and electromotive force has a large impact on the operating efficiency of a motor and generator. As more essential products, including vehicles, are moving to electricity, there is a significant need for a motor and generator with greater efficiency.

BRIEF DESCRIPTION OF DRAWINGS

Like reference symbols in the drawing figures indicate like elements.

DETAILED DESCRIPTION

A flux machine (FM 10) that may function as a motor or generator has been developed that increases efficiency significantly in laboratory testing. This new design that is disclosed herein relies on a novel arrangement of magnets and coils that produces superior flux and therefore is more efficient in operation. The apparatus described herein is an electric motor-generator of a type generally referred to in the art as a "flux machine" (FM 10). In some embodiments, the flux machine operates as a longitudinal flux machine. In other embodiments, the machine operates as a transverse flux machine (TFM). In still other embodiments the flux machine may be a hybrid longitudinal and transvers flux machine. For example, in recent years transverse flux machines have found favor in a wide range of applications, Whereas in standard electric motors, the electromagnetic force vector is parallel to its magnetic flux lines, in TEM's the electromagnetic force vector is perpendicular to the magnetic flux lines. The TFM design allows the pole number to be increased without reducing the magnetomotive force per pole, and is therefore capable of producing power densities higher than in a conventional machine. A TFM with a large number of poles and short current passages is attractive because a high torque/weight ratio, a high power/weight ratio and low copper losses are achievable.

An arrangement of coils and magnets has been developed that allows flux to be separately directed toward three different sides of the coils or coil assemblies. For instance, there may be two magnets that are oriented with poles facing inward or outward to direct flux in a radial direction on opposite sides of the coils, and a third that has poles facing axially, to direct flux in an axial direction on a third side of the coils. Additionally, the coils may be oriented so that the windings and current flows in a plane that is perpendicular to a vector pointing in an established circumferential direction of motion. This arrangement allows the three magnets to each be adjacent to a different side of the coils but since the coil frame is in a plane perpendicular to the plane of motion, each magnet only interacts with one of the sides of the coils. This allows three magnets to simultaneously interact with the coils providing a superior flux inducing arrangement.

Figure 1:
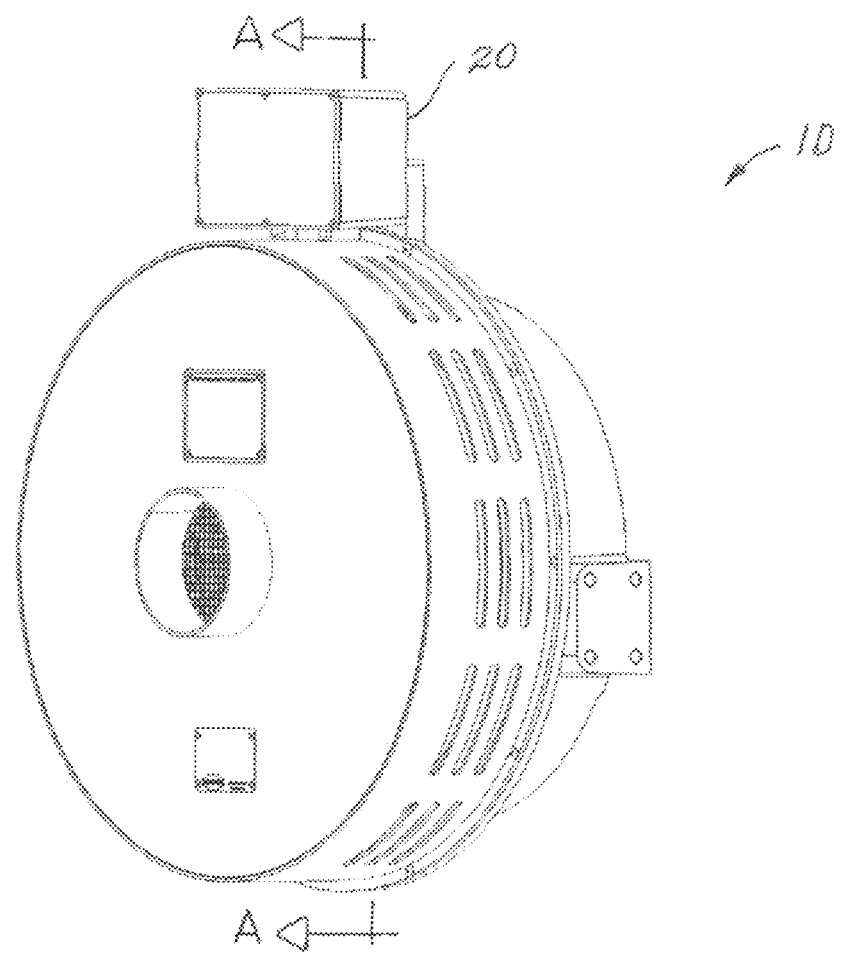
FIG. 1 is an example proximal perspective view of a flux machine described, illustrated, and claimed herein.
Figure 2:
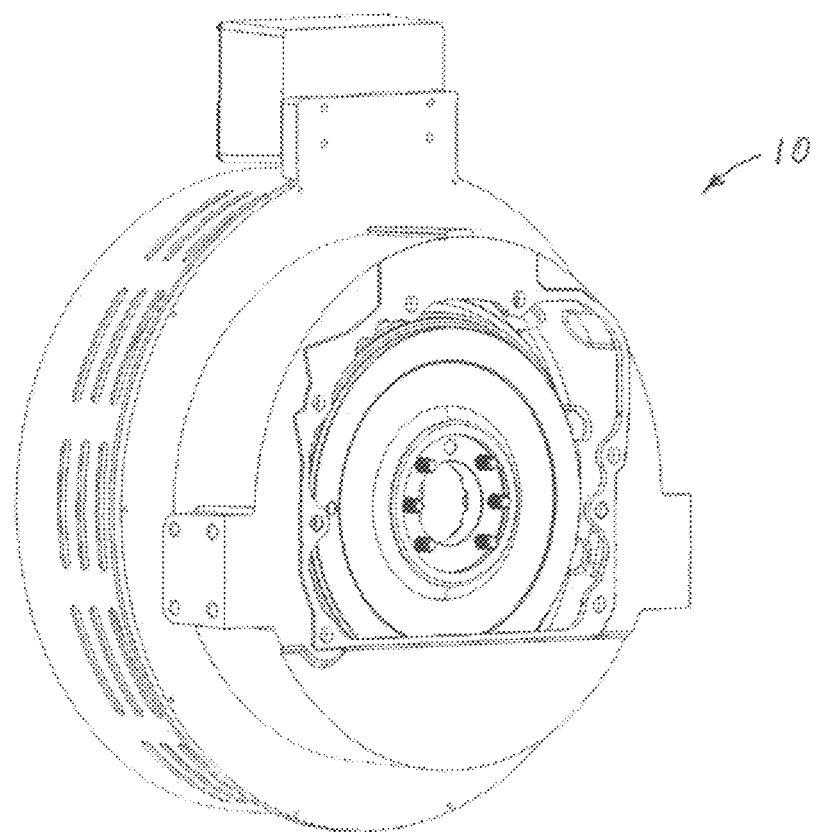
FIG. 2 is an example distal perspective view thereof.

FIGS. 1 and 2 shows an embodiment of the FM 10 which may be generally circular in shape and relatively short axially. In other embodiments, it also may be relatively longer axially, linear, or have other suitable configurations. Electrical connections may be made to FM 10 within a connection box 20 shown on top and a mechanical engagement with the FM 10 may be made distally. In this description a "distal" view or element is as seen from the rear (FIG. 4) and a "proximal" view or element is as seen from the front (FIG. 3) of the machine, Alternate mechanical and electrical interfacing may be employed.

Figure 3:
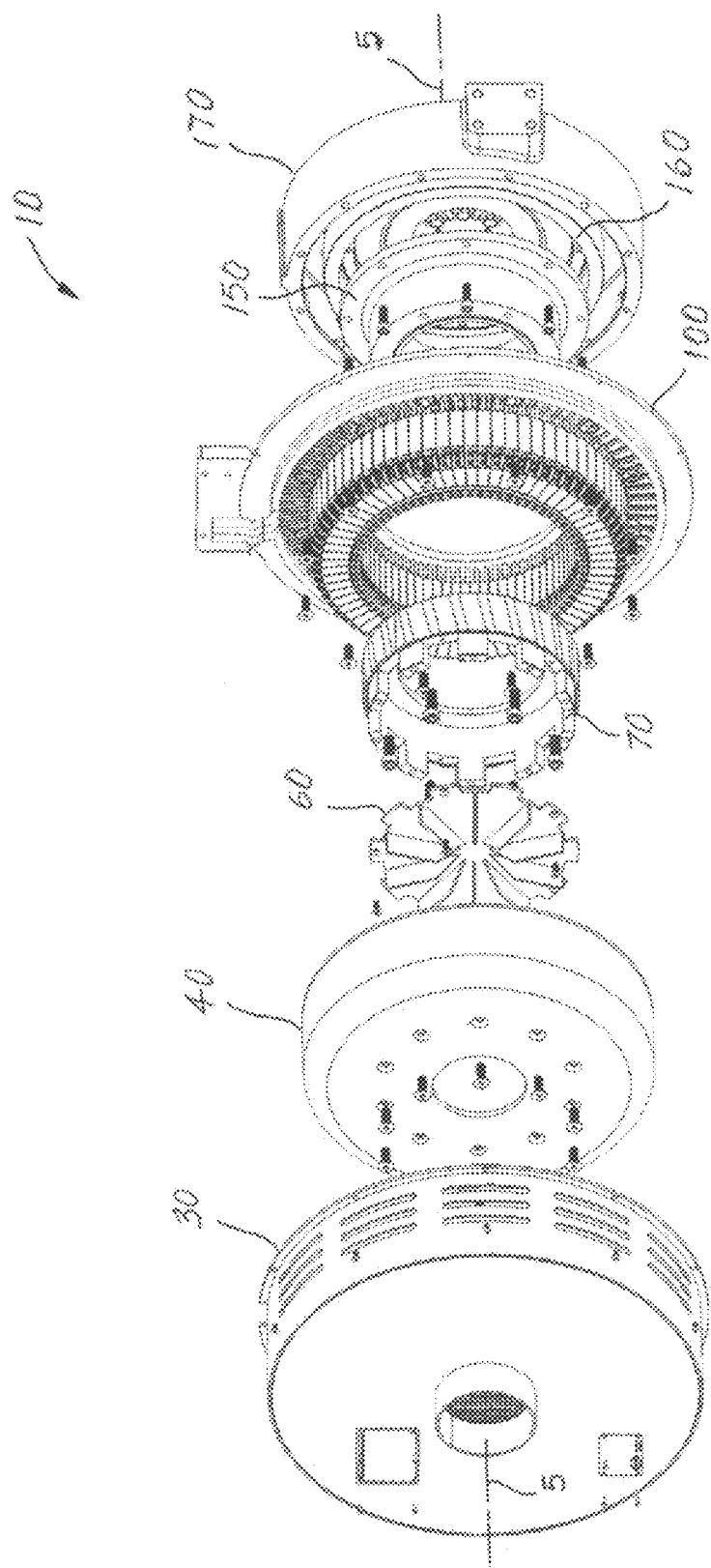
FIG. 3 is an example proximal perspective expanded view in accordance with FIG. 1.
Figure 4:
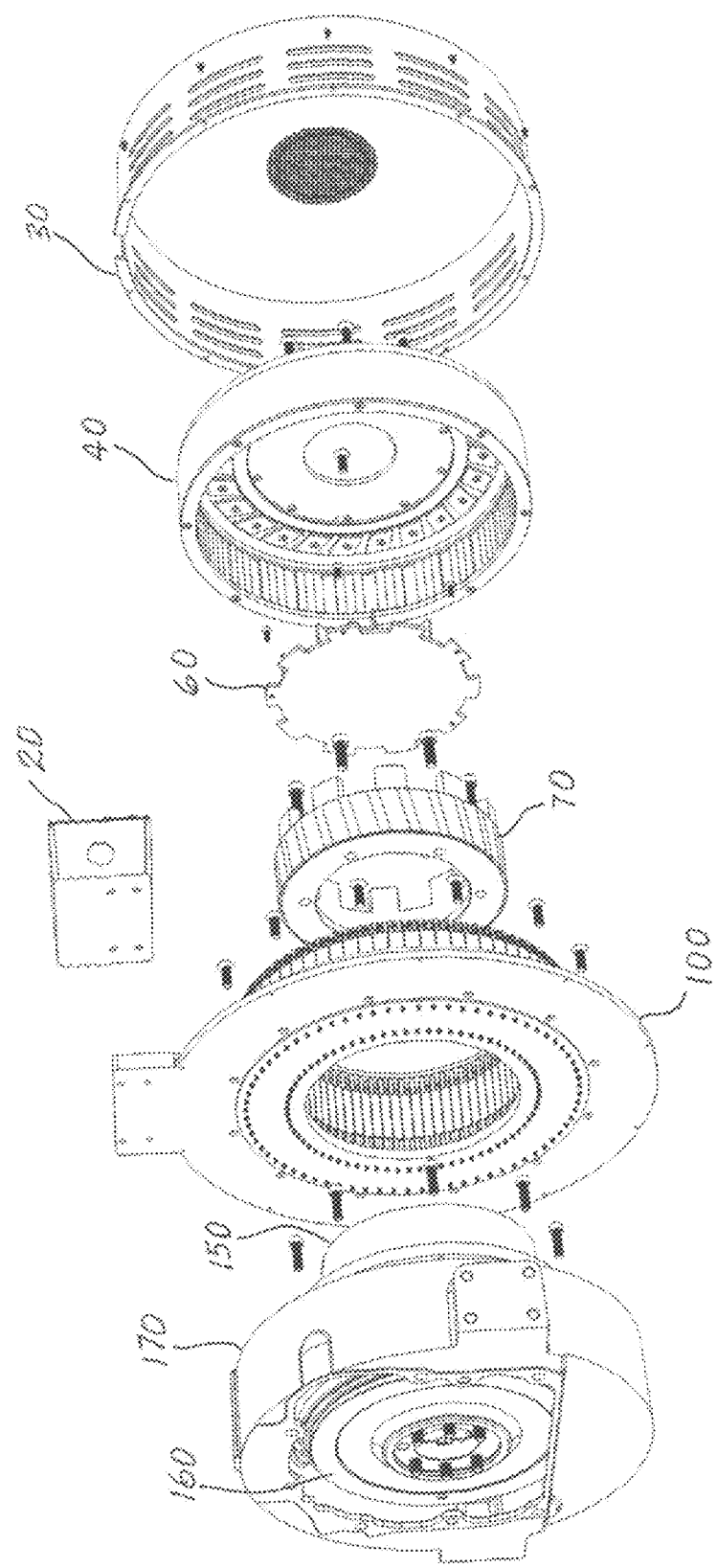
FIG. 4 is an example distal perspective expanded view in accordance with FIG. 2.

FIG. 3 illustrates the several components and sub-assemblies of FM 10 according to one embodiment, showing such items in the relative respective positions which they occupy during machine operation. Moving from left to right in FIG. 3 shown are: shroud 30, outer rotor-magnet assembly 40, fan 60, inner rotor-magnet assembly 70, stator assembly 100, rotor hub 150, flywheel 160, and flywheel housing 170. Flywheel 160 is not a part of FM 10 but is shown and described to enable an understanding of one manner by which FM 10 may be mechanically engaged for being driven as an electrical generator or for producing useful rotational output work as an electrical motor. Shown also in FIG. 3 are the common hardware screws which may be used to secure the several components and sub-assemblies together as a completed and assembled machine. Any other suitable attachment means may be used in place of screws to secure the several components and sub-assemblies together. All of the above identified parts of FM 10 are aligned axially on common axis 5 which is also the center of rotation of the rotor, that is: elements 40, 60, 70, and 150. FIG. 4 is a distal view of the same elements.

Figure 5:
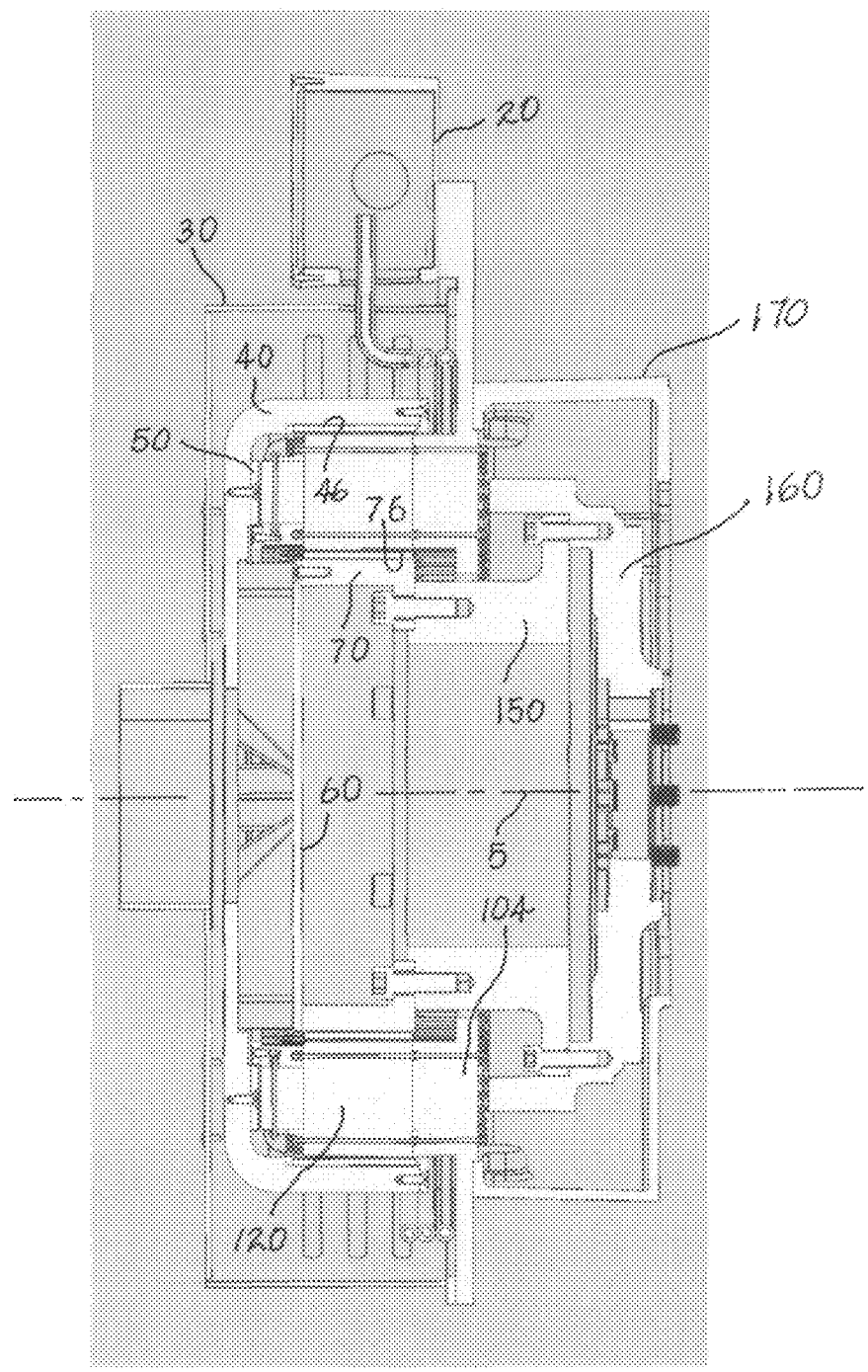
FIG. 5 is an example vertical section view taken at A-A in FIG. 1 and passing through a central rotational axis.

FIG. 5 shows an embodiment of a FM 10 in vertical cross section illustrating an embodiment of how rotor hub 150 is joined to flywheel 160, inner rotor-magnet assembly 70 is joined to rotor hub 150, fan 60 to inner rotor-magnet assembly 70; outer rotor-magnet assembly 40 to inner rotor-magnet assembly 70; stator assembly 100 to flywheel housing 170, and shroud 30 to stator assembly 100. FIG. 5 also shows the locations of permanent magnets 46, 50, and 76 as well as core-coil assembly 120. Alternative embodiments and constructions may be applied, including the selection and connectivity of the various components described herein. For instance, in some embodiments, the rotor and stator may be reversed, with appropriate electrical and mechanical connectivity adjusted.

Figure 6:
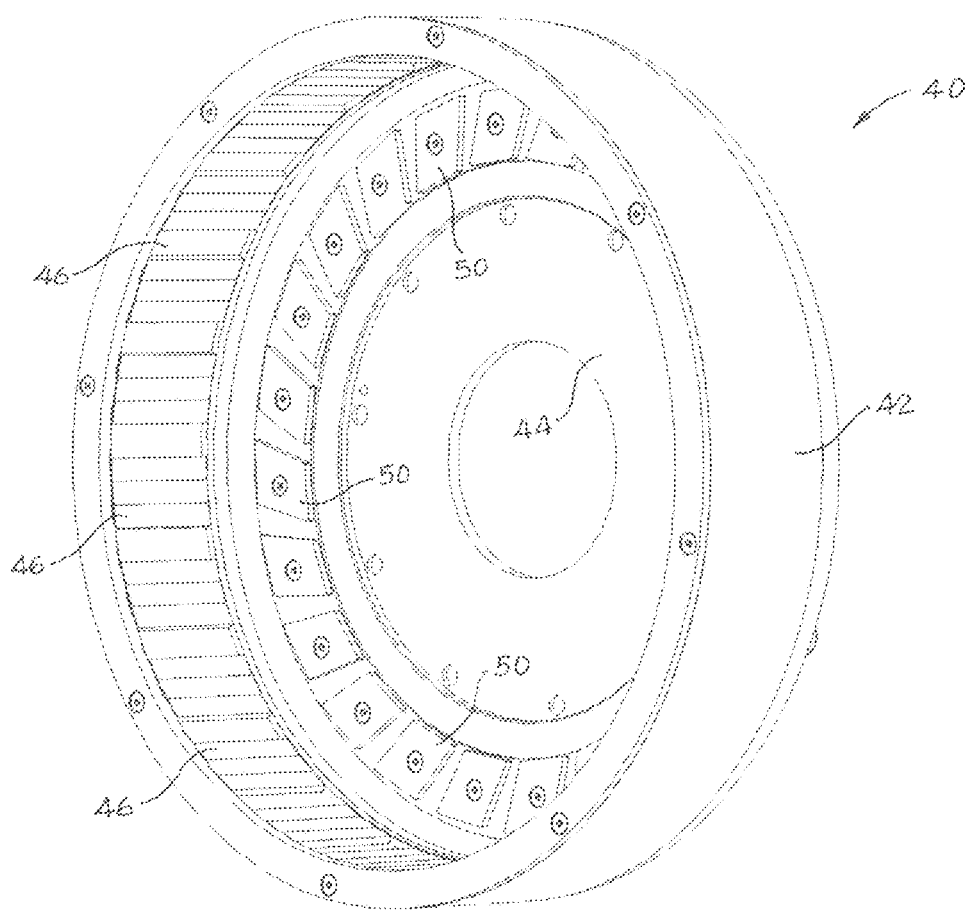
FIG. 6 is an example distal perspective view of an outer rotor-magnet assembly thereof.

Referring now to FIG. 6, it is shown that in some embodiments the outer rotor-magnet assembly 40 may have a cylindrical wall 42 and an end wall 44. Additionally, the outer rotor magnet assembly may be made of any other suitable configuration of rings, cylinders or other suitable connective components. Mounted on the cylindrical wall 42 may be OD radial magnets 46 and mounted on the end wall 44 may be axial magnets 50. The OD radial magnets 46 may be mounted on an inner surface of the cylindrical wall 42, an outer surface, in slots or spaces on the cylindrical wall 42, or any other suitable mounting. The axial magnets may be mounted on an inwardly facing surface 48 of an end wall 44, an outwardly facing surface, in slots or spaces in an end wall 44, or any other suitable arrangement. Each of the sets of magnets 46 and 50 may be arranged circularly or in other embodiments linearly. The magnets 46 and 50 may have planar pole faces producing flux lines normal thereto so that magnets 46 produce a radial flux and magnets 50 produce an axial flux. The magnets 46 and 50 are secured to their respective surfaces or any other suitable portions by a bonding agent such as an epoxy type or otherwise, and may be additionally secured by common hardware such as threaded screws installed into end wall 44 as shown or other suitable methods or devices.

Figure 7:
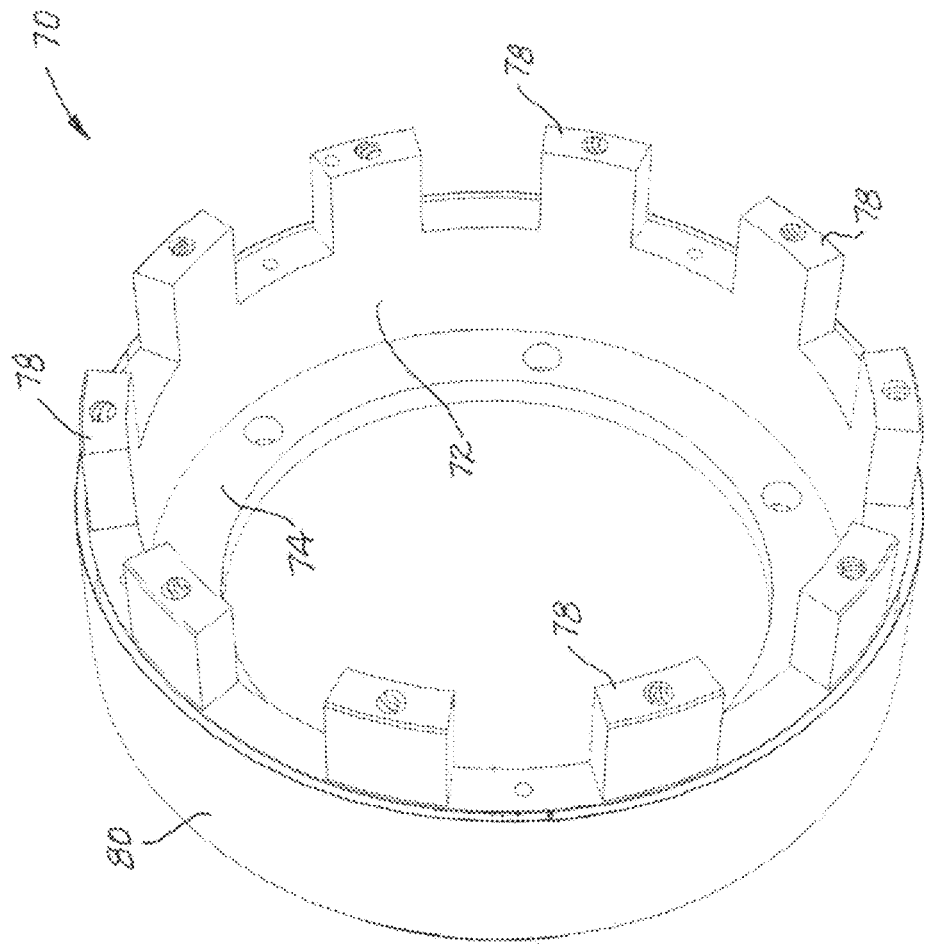
FIG. 7 is an example proximal perspective view of an inner rotor-magnet assembly thereof.
Figure 8:
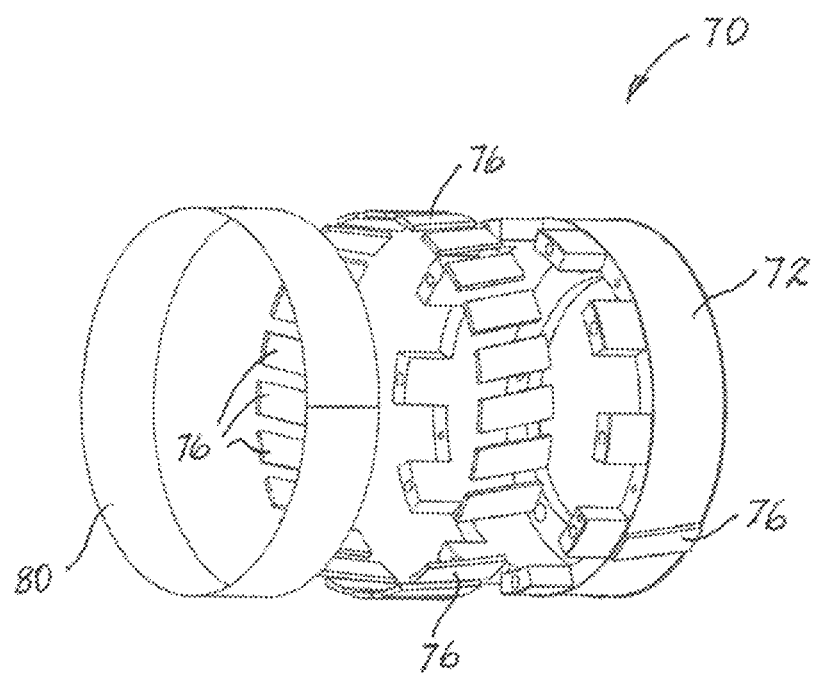
FIG. 8 is an expanded view of FIG. 7.

Referring now to FIGS. 7 and 8, it is shown that inner rotor-magnet assembly 70 may be a cylinder having a cylindrical outer wall 72 and an annular internal flange 74 at a distal end of outer wall 72. In other embodiments, the inner/rotor/stator may be construction of any suitable arrangement of materials, rings, walls, flanges, or connective pieces. Mounted, in a circular arrangement, on an outer surface of outer wall 72 may be ID radial magnets 76. Magnets 76 may also be mounted in spaces or connected with bars or other suitable means known in the art. Magnets 76 may be arc-shaped to coincide with the curved surface of outer wall 72 upon which they are set, and the pole surfaces may be facing outwardly to produce a radially directed magnetic flux. Magnets 76 may also be flat or any other suitable shapes. Magnets 76 may be secured to wall 72 or another suitable portion of the inner rotor/stator assembly 70 by a bonding agent such as an epoxy type or otherwise, and may be additionally secured by common hardware such as screws threaded into wall 72 or otherwise. As shown in FIGS. 7 and 8 an external non-ferrous circular cover 80 may be fitted over magnets 76 for improved securement thereof.

Magnets 46, 50, and 76 may be permanent magnets or electromagnets or a combination of both. In other embodiments, the outer and inner rotor-magnet assembly 70 and outer rotor magnet assembly 40 may be combined into a single rotor assembly, or the end wall 44 of the outer rotor magnet assembly may be attached to the inner rotor-magnet assembly 70. Additionally, the stator may be the rotor and the rotor the stator with appropriate adjustments to electrical and mechanical connectivity.

In other embodiments, inner rotor-magnet assembly 70 or outer rotor magnet assembly 40 may include two end walls 44, and with two mutually facing magnets 50 with axially directed flux each connected to one of the end walls 44, and one cylindrical wall 42, with a radial magnet 76 connected to the cylindrical wall 42 with radially directed flux. In this embodiment, the stator coils would be inside the rotor, with axial-radial-axial flux directed to three different sides of the coils. In this embodiment, the coils may be oriented so that current flows in a plane perpendicular to a vector circumferentially directed in the direction of motion.

Figure 9:
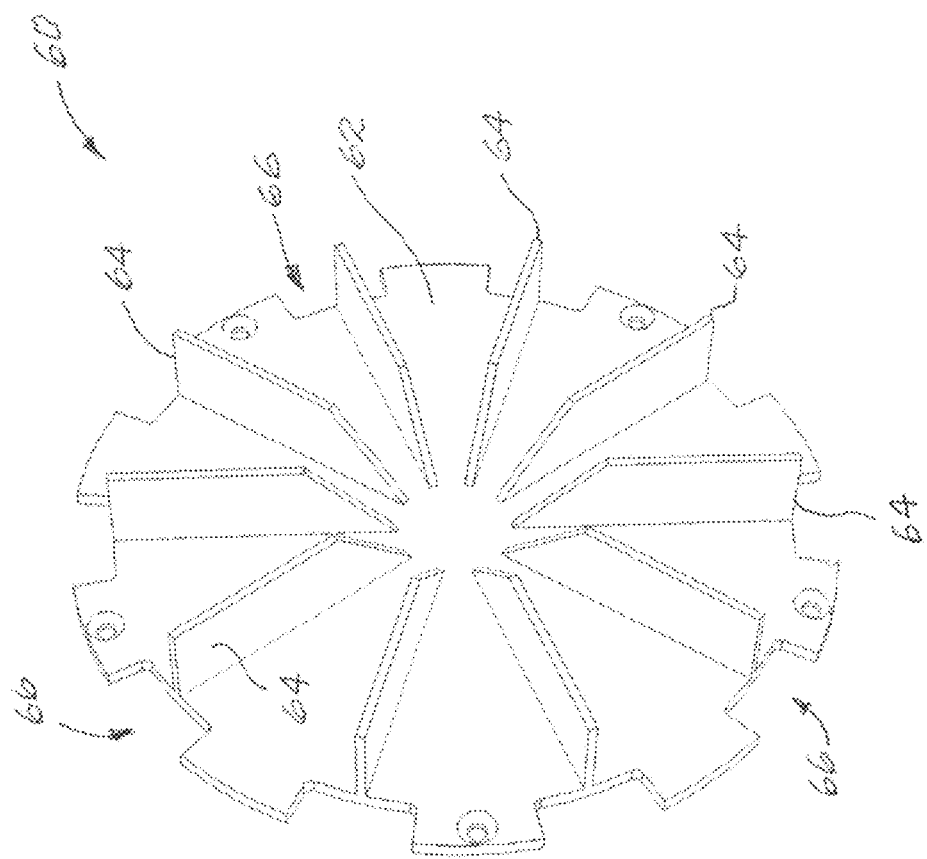
FIG. 9 is an example proximal perspective view of a radial fan thereof.

The fan 60 shown in FIG. 9 may be made up of a circular flat plate 62 upon which may be mounted, by welding or otherwise, radial vanes 64. During operation of FM 10 fan 60 may rotate about axis 5 to draw air into the machine axially through screen 31 (FIG. 1) whereby it is redirected radially by the vanes 64 for cooling coils 126 and cores 122 and 124. The air exits through slots 34 in shroud 30 (FIG. 1). As should be understood, fan 60 is engaged with inner rotor-magnet assembly 70 with axial fingers 78 thereof engaged with peripheral slots 66 in plate 62.

Figure 10:
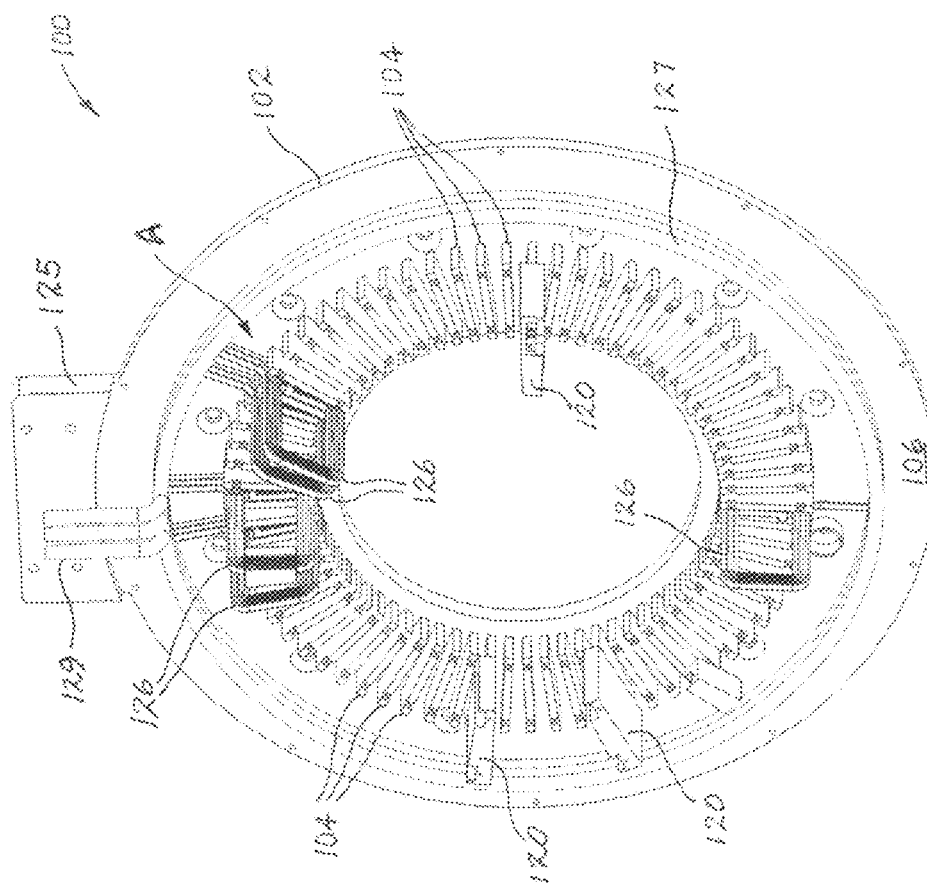
FIG. 10 is an example proximal perspective view of a stator assembly thereof with only a small number of representative core and coil elements shown.

Stator assembly 100 which in one embodiment may function as the rotor of FM 10, may have a metal structural frame shown in FIG. 10 which includes a frame disc 102 incorporating a circular array of mutually spaced-apart radial partitions 104 mounted on a proximal surface 106 of disc 102 as shown. In FIG. 10 several coils 126 are shown in their respective operating positions and are electrically interconnected through circular harness 127 which encircles partitions 104. Wires in harness 127 terminate at three lead conduits 129 adjacent to an electrical box flange 125, the latter being integral with, or attached to disc 102. In some embodiments, channels between adjacent partitions 104 may be used for routing electrical wires of coils 126 as shown at "A." Also shown in FIG. 10 there may be three cores 120. Cores 120 may be permeable cores, composites, laminates, or combinations of laminates and composites, or other suitable core construction.

Figure 11:
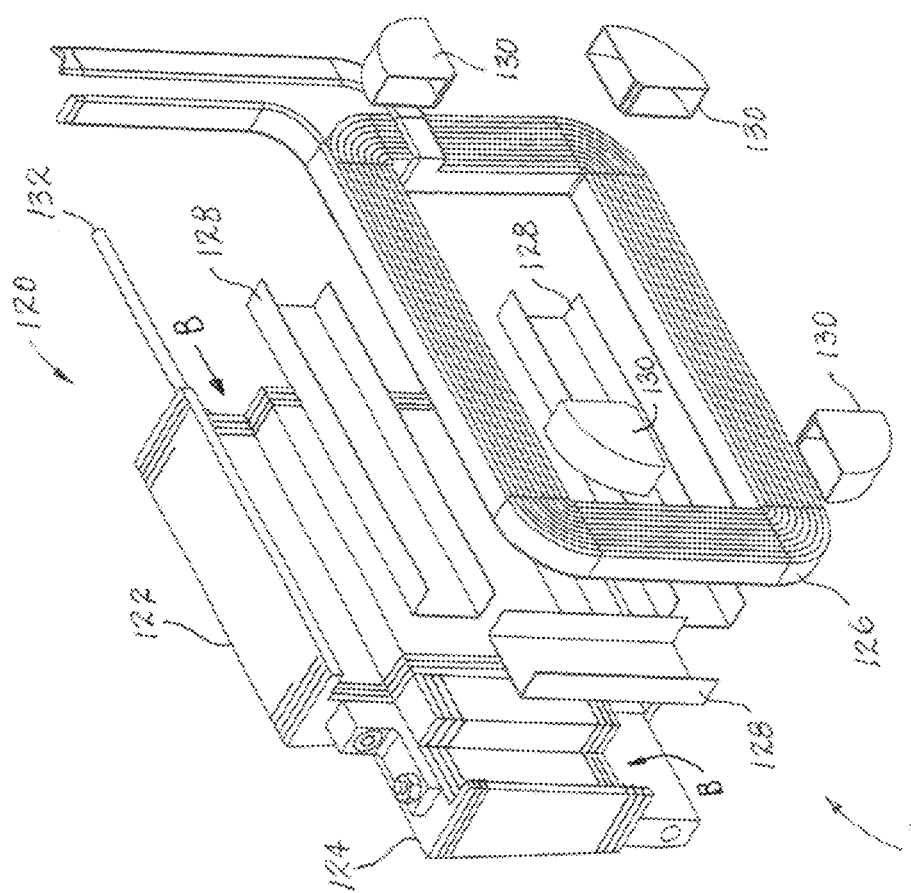
FIG. 11 is an example perspective expanded view of one core and coil assembly thereof.
Figure 12:
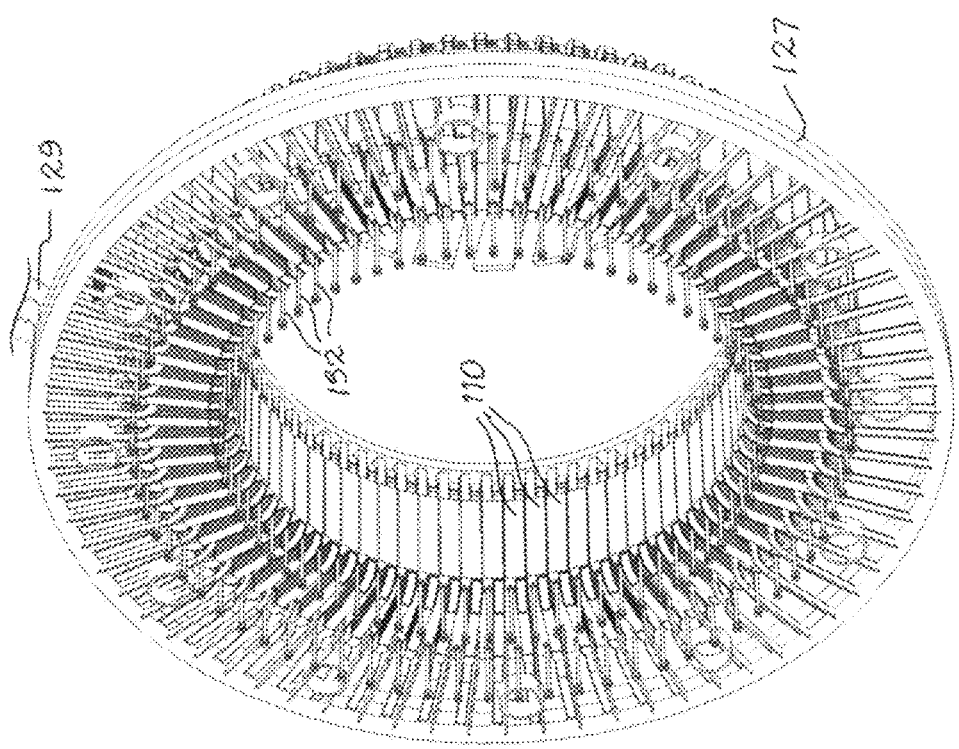
FIG. 12 is an example perspective distal view of a full complement of core-coil assemblies thereof showing coil wires routed to a circumventing wire harness.

A full complement of core-coil assemblies CCA 110 or coil assemblies, shown in FIG. 12, are mounted as part of stator assembly 100, with each CCA 110 mounted onto one of partitions 104 (FIG. 10). A typical CCA 110 is shown expanded in FIG. 11 illustrating a core 120 made up of two abutting silicon steel lamination stacks, a larger stack 122 with laminations aligned radially when mounted on stator assembly 100, and a smaller stack 124 with laminations aligned axially when so mounted. As shown, stacks 122, 124 are connected together using common hardware, or otherwise, and use common hardware 132 for bolting CCA 110 to frame disc 102 or may be connected through any other suitable means including welding. Other suitable coil-core assemblies 110 may include other suitable components, including a single core assembly. For instance, the core 120 may be of any conductive material including copper, or other suitable materials. In other embodiments, the core-coil assemblies 110 may be oval or circular or other suitable shapes.

Stack alignments may be orientated in a direction of magnetic flux from their respective adjacent magnets 46, 50, and 76. Core 120 may alternately be made of a single shaped block of compressed carbonyl iron particles, sponge iron powder, or otherwise. Coil 126 may be made up of a flat or rounded, or other shaped copper, or other material of wire wound in a rectangular, oval or circular shape to fit within accommodating channels in core 120 as shown in FIG. 11 at "B." In some embodiments, the flat wire of coil 126 is insulation coated and the several legs of coil 126 are further insulated from core 120 by U-shaped insulating sleeves 128 and tape covered corners 130. As can be seen in FIG. 11, in some embodiments magnetic flux in stacks 122 and 124 will be oriented at right angles to current flowing in the windings of coil 126 and thus produces a force in the third orthogonal direction which is the direction of rotation of the rotor. FIG. 12 is a distal view illustrating a full complement of CCA 110 showing coil wires extending to harness 127 and hardware 132 which penetrates partitions 104 and frame disc 102 (see FIG. 10) for securing all of the CCA 110 as a part of stator assembly 100.

As illustrated in FIG. 10, the core-coil assemblies 110 or coil assemblies 110 may be oriented so that the coils 126 are wrapped in a rectangular shape and oriented with respect to the rotor or stator so that the current flows in a plane that is perpendicular to a vector oriented in the circumferential direction of motion or rotation. In the embodiment illustrated in FIG. 10, the coils have three sides exposed for interaction with magnetic flux, including two sides exposed for interaction with flux of radial magnets 76 and 46, and one side exposed for interaction with flux of axial magnets 50. These interactions all occur in the same plane, and accordingly, each magnet only interacts with one side of each coil 126. This is advantageous because it allows three magnets to simultaneously interact with the coils and produce flux that contributes to the motive force and/or electricity generation.

When inner rotor-magnet assembly 70 is positioned within the circular arrangement of CCA 110, magnets 76 may be positioned in parallel and adjacent to inwardly facing surfaces of core-coil assemblies 110 and may be spaced apart therefrom by an air gap. When outer rotor-magnet assembly 40 is positioned around the outside of the circular arrangement of CCA 110, magnets 46 may be positioned in parallel with outwardly facing surfaces of stacks 122 and may be spaced apart therefrom by an air gap. It is further clear that when outer rotor-magnet assembly 40 is positioned around the circular arrangement of CCA 110, magnets 50 may be positioned in parallel with outwardly facing surfaces (in the axial direction) of stacks 124 and may be spaced apart therefrom by an air gap. FIG. 5 illustrates the positions of the magnets relative to the coil-core 120. It is clear than that with the sets of magnets 46, 50 and 76 positioned in close proximity to three sides of the sets of CCA 110, an electric current flowing in coils 126 will produce forces in a direction of rotation of the rotor about axis 5.

Figure 13:
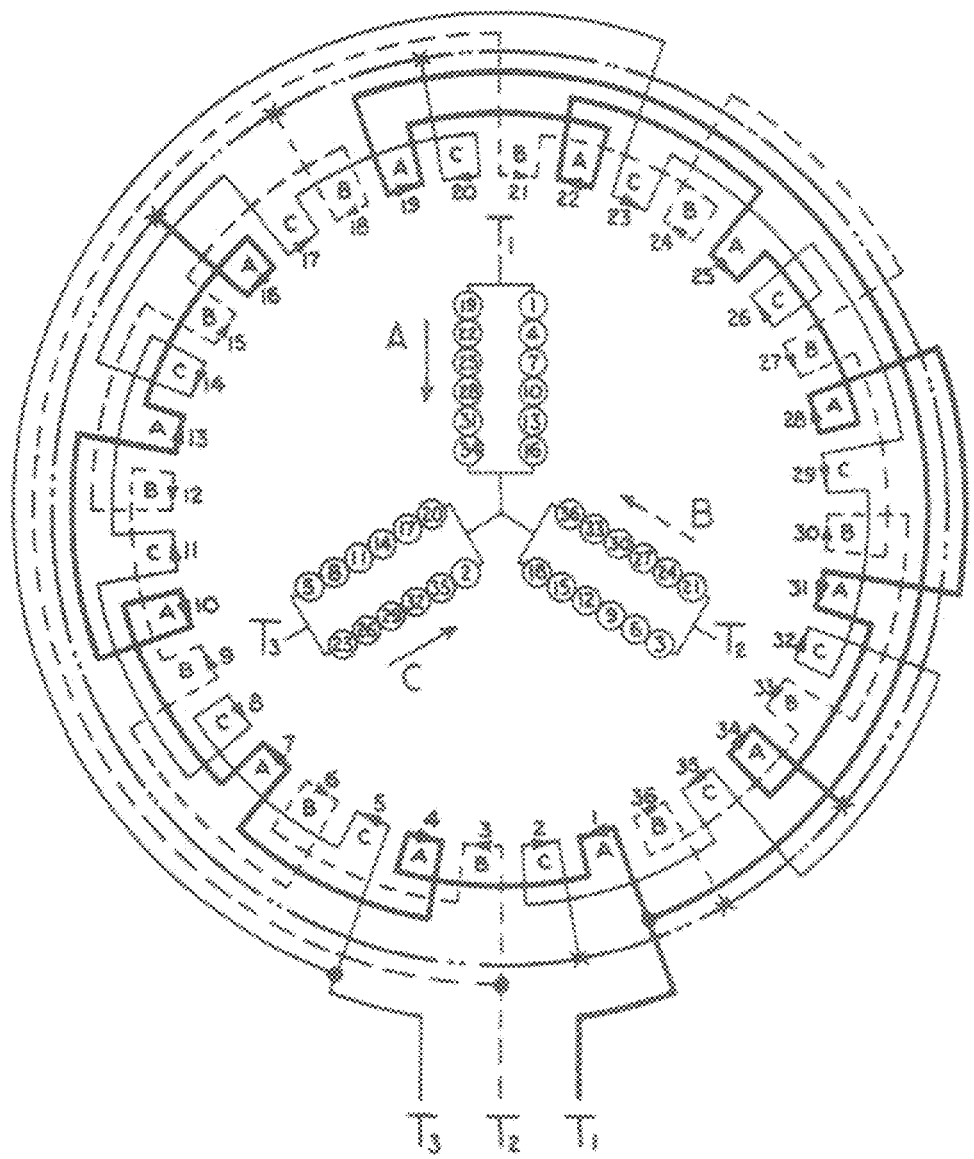
FIG. 13 is an example electrical wiring diagrams of a 12 pole, 2-parallel star connection diagram in accordance with the present disclosure.

FIG. 13 shows an electrical interconnection that may be made in a 12 pole, 3 phase, 2 parallel star connected version of FM 10. In FIG. 13, the outer circular diagram shows a method of wiring the poles of the three phases, and the inner diagram shows the Y-arrangement indicating which poles are interconnected in a series-parallel interconnection arrangement. FM 10 may be configured with a larger or smaller number of poles and with other electrical arrangements.

Embodiments of the subject apparatus and wiring arrangement have been described herein. Nevertheless, it will be understood that modifications by those of skill in the art may be made without departing from the spirit and understanding of this disclosure. Accordingly, other embodiments and approaches are within the scope of the following claims.

What is claimed is:

1. A flux machine comprising:
    a stator having a plurality of electrical core-coil assemblies, each of the plurality of electrical core-coil assemblies including a core and a corresponding coil, each core including a first portion and a second portion, the first portion of each core defining a first channel and a second channel parallel to the first channel, the second portion of each core defining a third channel perpendicular to the first channel and the second channel, the first channel, the second channel, and the third channel each having a generally U-shaped cross-section with a base and two opposing sidewalls, the two opposing sidewalls facing each other, each core being at least partially disposed within its corresponding coil such that each corresponding coil is at least partially disposed within the first channel, the second channel, and the third channel, each core being separate and distinct from all of the other cores of the plurality of electrical core-coil assemblies; and
    a rotor having a plurality of sets of magnets, each of the plurality of sets of magnets including a first magnet, a second magnet, and a third magnet, wherein a first one of the plurality of sets of magnets is configured to be positioned adjacent to a first one of the plurality of electrical core-coil assemblies such that pole faces of the same polarity of the first magnet, the second magnet, and the third magnet face toward the first one of the plurality of electrical core-coil assemblies, the pole faces of the same polarity of the first magnet and the second magnet facing toward each other and the pole face of the same polarity of the third magnet being perpendicular to the pole faces of the same polarity of the first magnet and the second magnet.

2. The flux machine of claim 1, wherein the core of each of the plurality of electrical core-coil assemblies includes a laminated structure having first laminations oriented perpendicular to the pole faces of the first magnet and the second magnet, and second laminations oriented perpendicular to the pole face of the third magnet.

3. The flux machine of claim 2, wherein the plurality of electrical core-coil assemblies is arranged in a circular array on partitions of the stator with electrical wires of the coils routed between adjacent partitions.

4. The flux machine of claim 1, wherein the first magnet and the second magnet face each other along a radial direction with respect to the axis of rotation.

5. The flux machine of claim 1, wherein a central portion of each core is configured to be disposed within its corresponding coil, and wherein a peripheral portion of each core is configured to be disposed about at least a portion of a periphery of its corresponding coil.

6. The flux machine of claim 1, further comprising an electrical insulating material disposed within the first channel, the second channel, and the third channel of each core, the electrical insulating material of each core electrically insulating the core from its corresponding coil.

7. The flux machine of claim 1, wherein the first channel, the second channel, and the third channel defined by each core generally form a U-shape.

8. The flux machine of claim 1, wherein the first portion of each core includes a first plurality of sheets of material stacked together and the second portion of each core includes a second plurality of sheets of material stacked together.

9. The flux machine of claim 1, wherein a first segment of each corresponding coil is disposed within the first channel of its core, a second segment of each corresponding coil is disposed within the second channel of its core, and a third segment of each corresponding coil is disposed within the third channel of its core.

10. The flux machine of claim 1, wherein the first magnet is configured to direct flux in a first direction toward a first side of the corresponding coil of the first one of the plurality of electrical core-coil assemblies, the second magnet is configured to direct flux in a second direction toward a second opposing side of the corresponding coil of the first one of the plurality of electrical core-coil assemblies, and the third magnet is configured to direct flux in a third direction toward a third side of the corresponding coil of the first one of the plurality of electrical core-coil assemblies.

11. The flux machine of claim 10, wherein the first direction and the second direction are radial directions, and wherein the third direction is an axial direction.

12. The flux machine of claim 11, wherein at least a second edge portion of each core is positioned between the second magnet and the second side of the corresponding coil.

13. The flux machine of claim 10, wherein the first direction and the second direction are axial directions, and wherein the third direction is a radial direction.

14. The flux machine of claim 13, wherein at least a third edge portion of each core is positioned between the third magnet and the third side of the corresponding coil.

15. The flux machine of claim 10, wherein at least a first edge portion of each core is positioned between the first magnet and the first side of the corresponding coil.

16. The flux machine of claim 1, wherein at least a portion of each corresponding coil is surrounded on three sides by the first channel, the second channel, and the third channel of its core.

17. The flux machine of claim 1, wherein each coil is wrapped in a generally rectangular shape.

18. The flux machine of claim 1, wherein each coil is oriented such that current flowing through each coil flows in a plane that is generally perpendicular to a vector pointed in a circumferential direction of rotation of the flux machine.

19. The flux machine of claim 1, wherein each magnet of the first one of the plurality of sets of magnets interacts with a single respective side of the coil of the adjacent first one of the plurality of electrical core-coil assemblies.

20. A flux machine comprising:
a stator having a first electrical core-coil assembly and a second electrical core-coil assembly, the first electrical core-coil assembly including a first core and a first coil, the first core including a first portion and a second portion, the first portion of the first core defining a first groove and a second groove parallel to the first groove, the second portion of the first core defining a third groove perpendicular to the first groove and the second groove, the first groove, the second groove, and the third groove each defining a base and two opposing sidewalls facing each other, the first coil being at least partially disposed within the first groove, the second groove, and the third groove, and the first core being at least partially disposed within the first coil, the second electrical core-coil assembly including a second core and a second coil, the second core including a first portion and a second portion, the first portion of the second core defining a fourth groove and a fifth groove parallel to the fourth groove, the second portion of the second core defining a sixth groove perpendicular to the fourth groove and the fifth groove, the fourth groove, the fifth groove, and the sixth groove each defining a base and two opposing sidewalls facing each other, the second coil being at least partially disposed within the fourth groove, and fifth groove, and the sixth groove and the second core being at least partially disposed within the second coil, the first core and the second core being separate and distinct from each other; and
a rotor having a first set of magnets and a second set of magnets, the first set of magnets including a first magnet, a second magnet, and a third magnet, the second set of magnets including a fourth magnet, a fifth magnet, and a sixth magnet,
the first set of magnets being configured to be positioned adjacent to the first electrical core-coil assembly such that a first pole face of the first magnet, the second magnet, and the third magnet faces toward the first electrical core-coil assembly,
the second set of magnets being configured to be positioned adjacent to the second electrical core-coil assembly such that a second pole face of the fourth magnet, the fifth magnet, and the sixth magnet face toward the second electrical core-coil assembly,
wherein (i) the first pole face of the first magnet and the second magnet face toward each other, and the first pole face of the third magnet is perpendicular to the first pole face of the first magnet and the second magnet, and (ii) the second pole face of the fourth magnet and the fifth magnet face toward each other, and the second pole face of the sixth magnet is perpendicular to the second pole face of the fourth magnet and the fifth magnet, the first pole face having a different polarity than the second pole face.

21. A flux machine comprising:
a stator having a plurality of electrical core-coil assemblies, each of the plurality of electrical core-coil assemblies including a core and a corresponding coil, each core including a first portion and a second portion, the first portion of each core defining a first channel and a second channel parallel to the first channel, the second portion of each core defining a third channel perpendicular to the first channel and the second channel, the first channel, the second channel, and the third channel each having a generally U-shaped cross-section with a base and two opposing sidewalls, the two opposing sidewalls facing each other, each core being at least partially disposed within its corresponding coil such that each corresponding coil is at least partially disposed within the first channel, the second channel, and the third channel, each core being separate and distinct from all of the other cores of the plurality of electrical core-coil assemblies; and
a rotor having a plurality of sets of magnets, each of the plurality of sets of magnets including a first magnet, a second magnet, and a third magnet, wherein a first of the plurality of sets of magnets is configured to be positioned adjacent to a first one of the plurality of electrical core-coil assemblies such that the first magnet is configured to direct flux toward a first side of the coil of the first one of the plurality of electrical core-coil assemblies, the second magnet is configured to direct flux toward a second opposing side of the coil of the first one of the plurality of electrical core-coil assemblies, and the third magnet is configured to direct flux toward a third side of the coil of the first one of the plurality of electrical core-coil assemblies.

* * * * *